United States Patent
Zheng (10) Patent No.: US 10,254,160 B2
(45) Date of Patent: Apr. 9, 2019

(54) COLOR AMBIENT LIGHT SENSOR CIRCUITRY FOR ELECTRONIC DEVICES

(71) Applicant: Apple Inc., Cupertino, CA (US)

(72) Inventor: Dong Zheng, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 15/465,409

(22) Filed: Mar. 21, 2017

(65) Prior Publication Data

US 2017/0328767 A1 Nov. 16, 2017

Related U.S. Application Data (60) Provisional application No. 62/337,141, filed on May 16, 2016.

(51) Int. Cl.
| | | |
|---|---|---|
| *G01J 1/44* | (2006.01) | |
| *G01J 1/42* | (2006.01) | |
| *G01J 1/04* | (2006.01) | |
| *G01J 3/28* | (2006.01) | |
| *G09G 3/20* | (2006.01) | |

(52) U.S. Cl.
CPC .......... *G01J 1/4204* (2013.01); *G01J 1/0466* (2013.01); *G01J 1/44* (2013.01); *G01J 3/2803* (2013.01);
(Continued)

(58) Field of Classification Search
CPC .............. G09G 3/2003; G09G 3/2092; G09G 2360/14; G09G 2360/141; G09G 2360/144; G09G 2330/023; G09G 2320/0626; G09G 2320/0666; G09G 2380/02; G09G 2380/10; G01J 1/42; G01J 1/44; G01J 1/0466; G01J 1/4204; G01J 3/28; G01J 3/2803;
(Continued)

(56) References Cited

U.S. PATENT DOCUMENTS

| | | |
|---|---|---|
| 5,521,708 A | 5/1996 | Baretta |
| 7,773,134 B2 * | 8/2010 | Tan ........................ G01J 1/0252 348/241 |

(Continued)

FOREIGN PATENT DOCUMENTS

| | | |
|---|---|---|
| CN | 1756267 A | 4/2006 |
| CN | 1894567 A | 1/2007 |

(Continued)

*Primary Examiner* — Darlene M Ritchie (74) *Attorney, Agent, or Firm* — Treyz Law Group, P.C.; G. Victor Treyz; Joseph F. Guihan (57) ABSTRACT

An electronic device may be provided with a display mounted in a housing. The display may have an array of pixels that form an active area and may have an inactive area that runs along an edge of the active area. A color ambient light sensor may gather ambient light measurements through a window in an opaque masking layer in the inactive area. The color ambient light sensor may have photodiodes with different spectral sensitivities and may have a dark current photodiode that is insensitive to light. A set of analog-to-digital converters may be used to digitize photodiode signals from the photodiodes. A switch array may be used to distribute signals from the photodiodes to each of the analog-to-digital converters. This allows the output of each photodiode to be averaged over multiple analog-to-digital converters to remove any impact of variations in performance between converters.

18 Claims, 6 Drawing Sheets

(52) U.S. Cl.
CPC ......... *G09G 3/2003* (2013.01); *G09G 3/2092* (2013.01); *G01J 2001/446* (2013.01); *G01J 2001/4406* (2013.01); *G09G 2320/0626* (2013.01); *G09G 2320/0666* (2013.01); *G09G 2360/144* (2013.01); *G09G 2380/02* (2013.01); *G09G 2380/10* (2013.01)

(58) Field of Classification Search
CPC ......... G01J 2001/4406; G01J 2001/446; G01J 2003/2806; H03M 1/06; H03M 1/0634; H03M 1/0658; H03M 1/066; H03M 1/0663; H03M 1/0675; H03M 1/0678; H03M 1/12; H03M 1/1205; H03M 1/121; H03M 1/1215
See application file for complete search history.

(56) References Cited

U.S. PATENT DOCUMENTS

| | | |
|---|---|---|
| 9,185,316 B2 | 11/2015 | Cheon et al. |
| 2003/0210221 A1* | 11/2003 | Aleksic ............... G09G 3/3406 345/102 |
| 2008/0179497 A1 | 7/2008 | Maniam et al. |
| 2009/0302360 A1 | 12/2009 | Shinomiya |
| 2013/0076712 A1* | 3/2013 | Zheng ..................... G01J 1/32 345/207 |
| 2013/0129212 A1 | 5/2013 | Fomitchov et al. |
| 2014/0266826 A1* | 9/2014 | Valley ................... H03M 1/12 341/137 |
| 2014/0267202 A1* | 9/2014 | Zheng ................. G01J 1/4204 345/207 |
| 2015/0077320 A1* | 3/2015 | Sato ................... H03M 1/0634 345/102 |
| 2016/0269669 A1* | 9/2016 | Kim ..................... H04N 5/347 |
| 2018/0184036 A1* | 6/2018 | Sato ..................... G02B 7/346 |

FOREIGN PATENT DOCUMENTS

| | | |
|---|---|---|
| CN | 102446911 A | 5/2012 |
| CN | 203349929 U | 12/2013 |
| CN | 103759824 A | 4/2014 |
| CN | 103940505 A | 7/2014 |
| CN | 104809975 A | 7/2015 |

* cited by examiner

COLOR AMBIENT LIGHT SENSOR CIRCUITRY FOR ELECTRONIC DEVICES

This application claims the benefit of provisional patent application No. 62/337,141, filed May 16, 2016, which is hereby incorporated by reference herein in its entirety.

BACKGROUND

This relates generally to electronic devices, and, more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate.

Ambient light sensors may contain photodiodes that convert incoming light to analog signals. The analog signals may be digitized using analog-to-digital converter circuitry. The digitized signals can be used in adjusting display brightness and taking other actions in a device.

It can be challenging to accurately convert light into digital measurements. If care is not taken, it may be difficult or impossible for analog-to-digital converter circuitry to accurately convert photodiode signals into digital light measurements.

SUMMARY

An electronic device may be provided with a display mounted in a housing. The display may have an array of pixels that form an active area and may have an inactive area that runs along edge portions of the active area. A color ambient light sensor may gather ambient light measurements through a window in an opaque masking layer in the inactive area. The ambient light measurements may include measured ambient light intensity and color information. Control circuitry in the electronic device may make adjustments to display brightness and color based on the ambient light intensity and color information.

The color ambient light sensor may have photodiodes with different spectral sensitivities and may have a dark current photodiode that is insensitive to light. The dark current photodiode may produce a dark current signal that is subtracted from the signals of the other photodiodes.

A set of analog-to-digital converters may be used to digitize signals from the photodiodes. A switch array may be used to distribute signals from the photodiodes to each of the analog-to-digital converters. This allows the output of each photodiode to be sampled and averaged using the same set of multiple analog-to-digital converters and thereby eliminates the impact of variations in performance between analog-to-digital converters.

DETAILED DESCRIPTION

Figure 1:
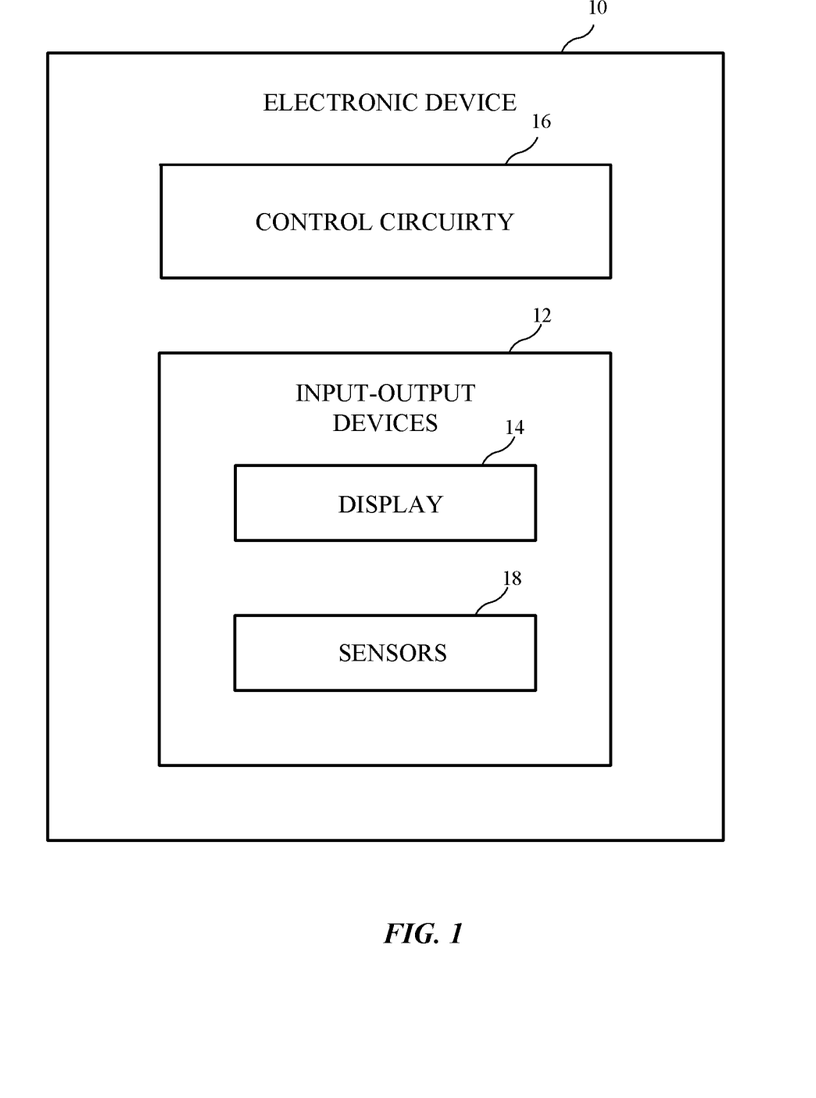
FIG. 1 is a schematic diagram of an illustrative electronic device having a light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include a capacitive proximity sensor, a light-based proximity sensor, a magnetic sensor, an accelerometer, a force sensor, a touch sensor, a temperature sensor, a pressure sensor, a compass, a microphone or other sound sensor, and other sensors. Sensors 18 may also include one or more color ambient light sensors. A color ambient light sensor may be used to measure the color (color temperature, color coordinates, etc.) of ambient light and may be used to measure ambient light intensity. To make color measurements, a color ambient light sensor may have light detectors that are sensitive to different portions of the light spectrum. As an example, a color ambient light sensor may have a first light detector that is sensitive to red light, a second light detector that is sensitive to green light, and a third light detector that is sensitive to blue light. As another example, there may be fewer than three or more than three light detectors (e.g., there may be 2-10, 5-10, more than 3, more than 4, more than 5, more than 6 fewer than 10, or other suitable number of light detectors of different colors).

By measuring how much light is present for each color (e.g., how much light is detected by the red light detector, how much light is detected by the green light detector, and how much light is detected by the blue light detector), control circuitry 16 can produce color temperature measurements and other color measurements (e.g., colors represented in color coordinates, etc.).

Information from a color ambient light sensor may be used in controlling display 14 and/or in taking other actions in device 10. As an example, display brightness may be automatically increased by control circuitry 16 in response to detection of bright ambient light conditions and may be automatically decreased by control circuitry 16 in response to detection of dim ambient light conditions. The color cast of images displayed on display 14 can be adjusted based on ambient light color measurement (e.g., to make the images on display 14 yellower in warm ambient lighting conditions and to make the images on display 14 bluer in cold ambient lighting conditions).

Figure 2:
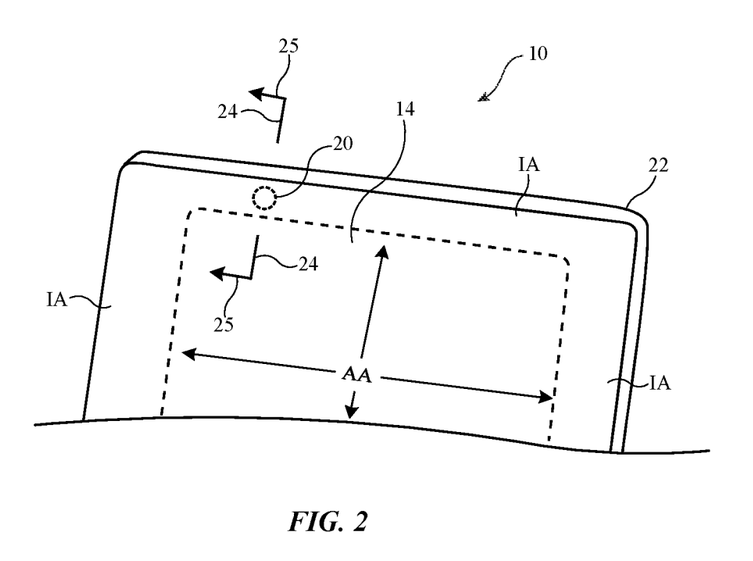
FIG. 2 is a perspective view of a portion of an electronic device display within which an ambient light sensor has been mounted in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may be a liquid crystal display, an electrophoretic display, an organic light-emitting diode display or other display with an array of light-emitting diodes, may be a plasma display, may be an electrowetting display, may be a display based on microelectromechanical systems (MEMs) pixels, or may be any other suitable display. Display 14 may have an array of pixels in active area AA. The pixels of active area AA may display images for a user of device 10. Active area AA may be rectangular or may have other suitable shapes.

Inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.) may be mounted under inactive border area IA. One or more openings (sometimes referred to as windows) may be formed in the opaque masking layer of inactive area IA to accommodate the optical components. For example, a light component window such as an ambient light sensor window may be formed in a peripheral portion of display 14 such as region 20 in inactive border area IA. Ambient light from the exterior of device 10 may be measured by an ambient light sensor in device 10 after passing through region 20 and the display cover layer. If desired, other portions of device 10 may be provided with regions to receive ambient light (e.g., openings may be formed in housing 12, etc.).

Figure 3:
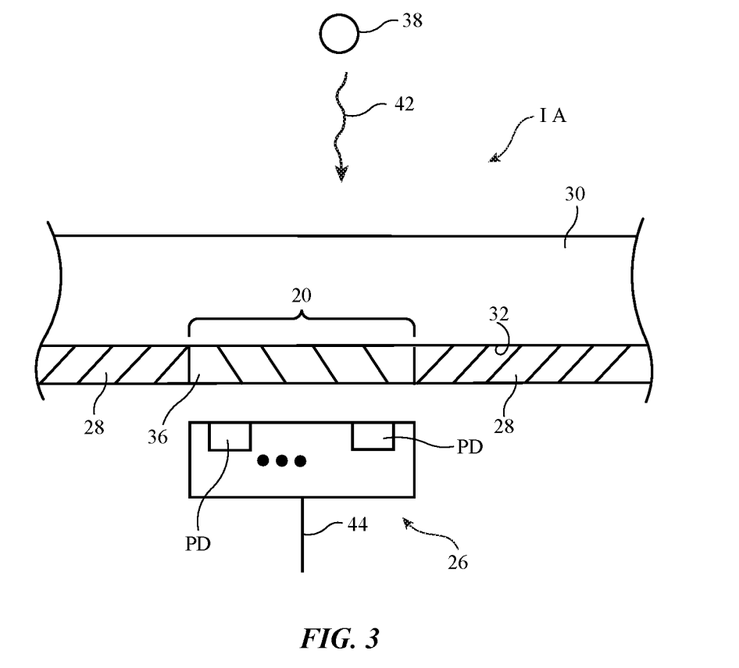
FIG. 3 is a cross-sectional side view of an illustrative light sensor that is measuring ambient light in accordance with an embodiment.

FIG. 3 is a cross-sectional side view of display 14 of FIG. 2 taken along line 24 and viewed in direction 25 of FIG. 2. As shown in FIG. 3, light sensor 26 may be mounted in alignment with window 20. Light sensor 26 may be an ambient light sensor that is used in measuring ambient light. Ambient light 42 may be produced by one or more light sources (i.e., the sun, artificial lighting, etc.) such as light source 38. Ambient light 42 may reach device 10 directly and/or may be reflected towards device 10 from objects in the environment surrounding device 10. Ambient light 42 may be measured by ambient light sensor 26 after passing through window 20.

Display cover layer 30 may have a portion that covers active area AA of display 14 and a portion such as the portion shown in FIG. 3 that covers inactive area IA. Window 20 may be formed from an opening in opaque masking layer 28 on inner surface 32 of display cover layer 30 in inactive area IA. Layer 30 may be formed from glass, plastic, ceramic, sapphire, or other transparent materials and may be a part of display 14 or a separate protective layer that covers active display structures. The opening associated with window 20 may be filled with window material 36. Window material 36 may be material that is sufficiently transparent to allow at least some of light 42 to reach ambient light sensor 26. With one illustrative configuration, opaque masking layer 28 is formed from a material that is sufficiently opaque to block 99% or more or 99.5% or more of ambient light 42 and window material 36 is sufficiently transparent to allow ambient light sensor 26 to make measurements of color and intensity on light 42. Window material 36 may be, for example, an ink or other material that allows 4% of light 42 to pass or may have other suitable transmissivity values (i.e., the transmissivity of window material 36 may be 2-10%, may be 2-6%, may be more than 1%, may be less than 10%, etc.). If desired, material 36 may be omitted, may be formed from a transparent material such as a clear polymer, etc. Configurations in which material 36 allows only a fraction of light 42 to pass may help enhance the appearance of device 10 by blocking light sensor 26 from view from the exterior of device 10.

Light sensor 26 may have one or more light detectors such as photodiodes PD. Photodiodes PD may include photodiodes for measuring two or more different colors of light (i.e., the spectral response of different photodiodes PD may be different from each other). Photodiodes PD may include discrete photodiodes (e.g., light detectors that are formed from individually packaged photodiode dies) or two or more, three or more, or all of photodiodes PD may be fabricated on a common semiconductor die. The spectral responses of photodiodes PD may be adjusted by placing colored polymer or other color filter structures over photodiodes PD (e.g., a red filter over a "red" photodiode, a green filter over a "green" photodiode, and a blue filter over a "blue" photodiode). Color ambient light sensor control circuitry such as portions of control circuitry 16 may use paths such as path 44 to gather signals (currents) from photodiodes PD and to covert these analog signals into digital ambient light sensor data. For example, if control circuitry 16 detects no signals from the green and blue photodiodes and detects a strong signal from the red photodiode, control circuitry 16 can determine that ambient light 42 is bright red and can take appropriate action based on the red color of ambient light 42.

Control circuitry 16 may have analog-to-digital converter circuitry that can digitize analog signals from multiple photodiodes PD to create a series of associated digital photodiode measurements of different colors. These measurements can be digitally processed to determine the color and intensity of ambient light 42. If desired, photodiodes PD may include a photodiode that measures dark current (i.e., the current of a photodiode in the absence of light). This type of photodiode may have the same size and shape as the red, green, and blue photodiodes (as an example), but be covered with an opaque mask so that the only signal produced at the output of the photodiode is associated with dark current (i.e., this photodiode may serve as a dark current photodiode). The dark current of dark current photodiode PD is not affected by the amount of ambient light 42 that is present, but rather is associated with the residual current supplied by each of photodiodes PD in the absence of light 42. In configurations in which photodiodes PD contain a dark current photodiode, the signal from the dark current photodiode may be subtracted from the outputs of the other photodiodes, thereby removing this source of signal inaccuracy.

Figure 4:
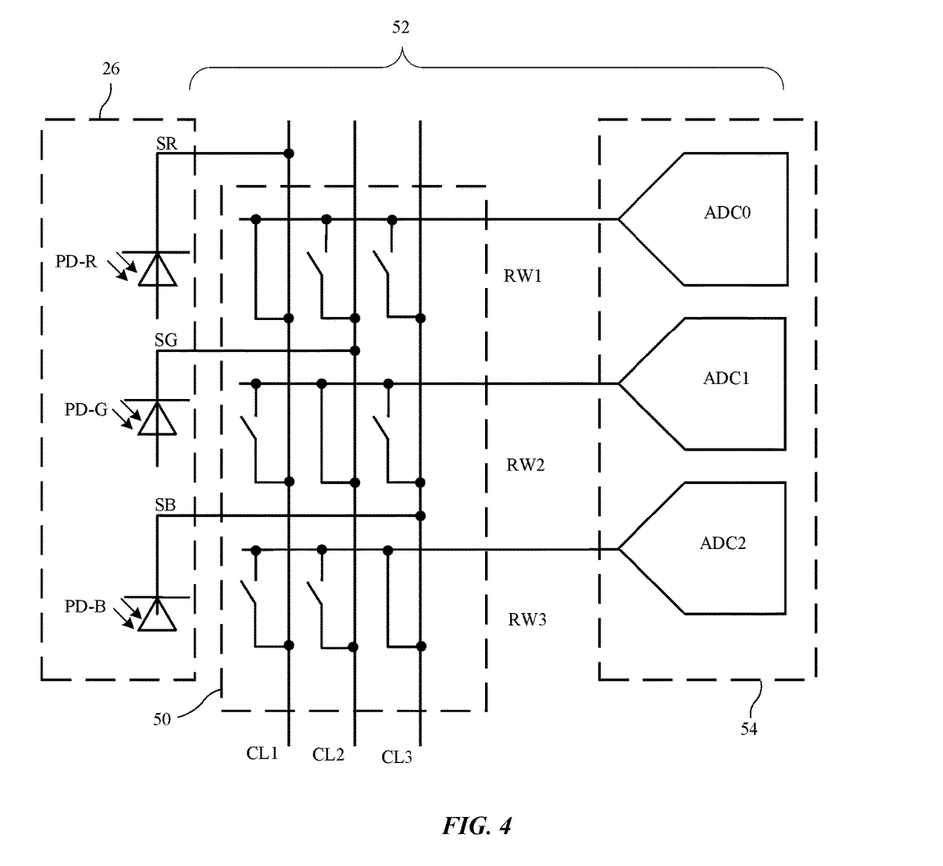
FIG. 4 is a circuit diagram of illustrative analog-to-digital converter circuitry for measuring signals from photodiodes of different colors in accordance with an embodiment.

FIG. 4 is a circuit diagram of an illustrative ambient light sensor and associated analog-to-digital converter circuitry. In the example of FIG. 4, ambient light sensor 26 includes three photodiodes PD-R (a red-light-sensitive photodiode), PD-G (a green-light-sensitive photodiode), and PD-B (a blue-light-sensitive photodiode). Analog-to-digital converter circuitry (color ambient light sensor circuitry) 52 may include control circuitry and analog-to-digital converters 54 and may form part of circuitry 16 of FIG. 1.

As shown in FIG. 4, circuitry 52 may include switching circuitry 50. Switching circuitry 50 may include an array of switches (e.g., a two-dimensional switch array of nine switches arranged in in three rows RW1, RW2, and RW3 and three columns CL1, CL2, and CL3 in the example of FIG. 4). The matrix of switches in switching circuitry 50 may be used to selectively distribute signals SR, SG, and SB from diodes PD-R, PD-G, and PD-B to each of converters 54. This allows signals to be averaged across analog-to-digital converters.

During operation, control circuitry 16 can repeatedly reconfigure the switches in switching circuitry 50 so that signal SR is distributed to converter ADC0 during a first time period (e.g., by closing the switch in row RW1 and column CL1 while opening the switches in row RW1 and columns CL2 and CL3), is distributed to converter ADC1 during a second time period (e.g., by closing the switch in row RW2 and column CL2 while opening the switches in row RW2 and columns CL1 and CL3), and is distributed to converter ADC2 during a third time period (e.g., by closing the switch in row RW3 and column CL3 while opening the switches in row RW3 and columns CL1 and CL2). The first, second, and third time periods may be equal (as an example) and may repeat (e.g., so that subsequent signals SR will likewise be distributed across all three converters 54).

At the same time that switching circuitry 50 is distributing signal SR to one of converters 54, switching circuitry 50 is distributing signal SG from photodiode PD-G to another of converters 54 and is distributing signal SB from photodiode PD-B to yet another of converters 54. For example, signal SG may be routed to converter ADC1 and signal SB may be routed to converter ADC2 while signal SR is being routed to converter AD0 (i.e., during the first time period). When signal SR is being routed to ADC1 (i.e., during the second time period), signal SG may be routed to ADC2 and SB may be routed to ADC0. This distribution process may be carried on repeatedly while gathering ambient light sensor data. The data that is gathered in each complete distribution cycle (i.e., the reading gathered during each set of three time periods in this example) may be used as an isolated color light sensor measurement or may form a single data point in a series of multiple data points each of which is associated with a separate distribution cycle (e.g., when gathering ambient light sensor data over an extended period of time).

Analog-to-digital converter circuits 50 may each include a transimpedance amplifier that converts input signals such as currents from photodiodes PD into corresponding voltages and analog-to-digital conversion circuitry that converts these voltages into digital output signals. The analog-to-digital converter circuitry of circuits 50 (e.g., the transimpedance amplifiers) may be characterized by gains and offset currents. Ideally, the gain and offset of each analog-to-digital converter is identical (as an example), but in practice, variations in gain and offset are generally present across different analog-to-digital converter circuits, particularly when the analog-to-digital converter circuits are operated over a range of temperatures. With the configuration of FIG. 4, however, any variations in analog-to-digital converter performance (e.g., gain, offset) will be averaged out, because the output of each photodiode PD will be measured by each analog-to-digital converter circuit in succession.

Consider, for example, a scenario in which the performance of ADC0, ADC1, and ADC2 are all different. In this scenario, even if all three photodiodes produce the same output current, the outputs of converters 54 would all be different in the event that PD-R provided signals only to ADC0, PD-G provided signals only to ADC1, and PD-B provided signals only to ADC2. When switching circuitry 50 is used to allow each photodiode signal to be digitized by all three analog-to-digital converters 54, any differences in the performances of ADC0, ADC1, and ADC2 will not change the final averaged digital output for the red, green, and blue channels. As a result, calibration operations for converters 54 may be minimized or omitted, even if converters 54 are operated over a wide range of temperatures that might otherwise exacerbate variations in gain and offset between converters ADC0, ADC1, and ADC2.

Figure 5:
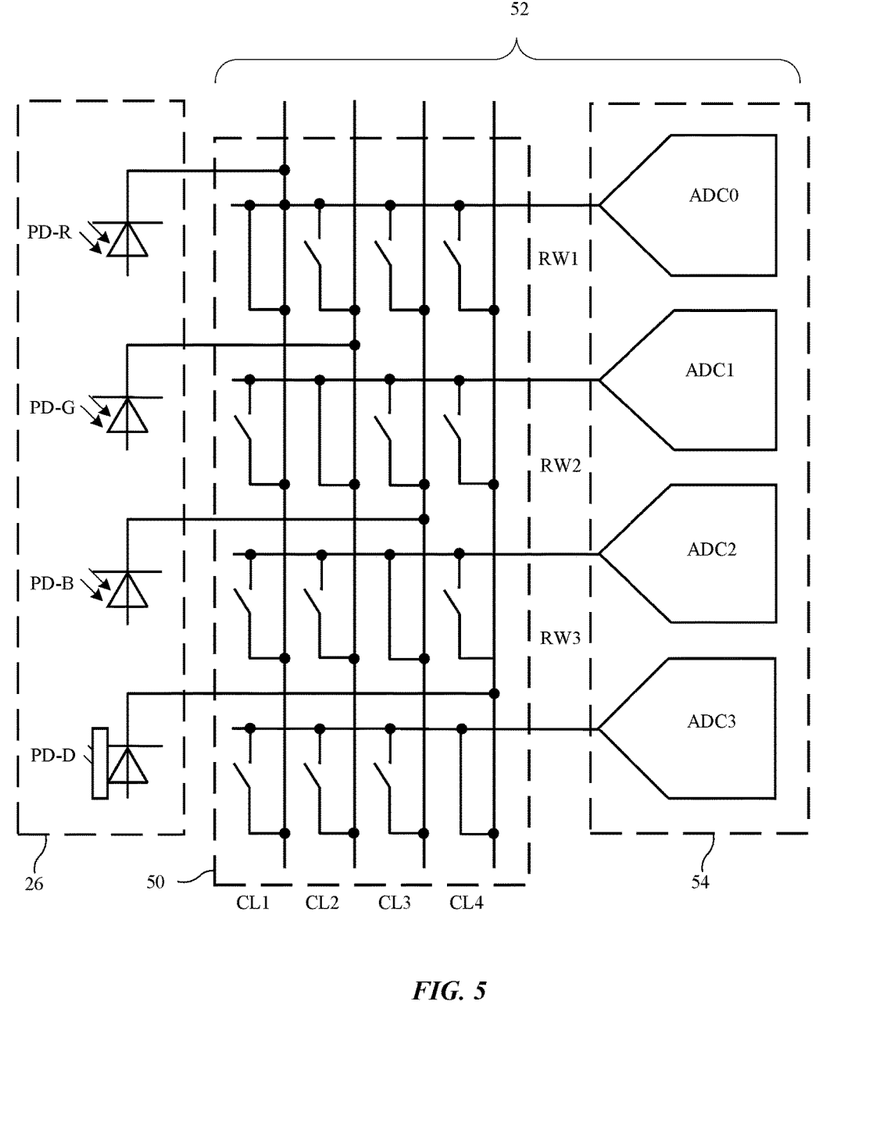
FIG. 5 is a circuit diagram of illustrative analog-to-digital converter circuitry for measuring signals from photodiodes of different colors and a dark current reference photodiode in accordance with an embodiment.

FIG. 5 is a circuit diagram showing how color ambient light sensor 26 may include a dark current photodiode PD-D (i.e., a photodiode that is not responsive to incoming light but which generates a dark current output that is representative of the dark current that is simultaneously being produced by each of the similarly constructed photodiodes in sensor 26). As with the arrangement of FIG. 4, switching circuitry 50 of FIG. 5 may be cycled through a series of different switch configurations (i.e., four different configurations for the FIG. 5 arrangement), each of which allows a different respective converter 54 to measure the output from a different respective photodiode.

After switching circuitry 50 has been placed in each of its four different switching configurations and after converters ADC0-ADC3 have been used to gather 16 photodiode measurements (four each from photodiodes PD-R, PD-G, PD-B, and PD-D in each of the four configurations), control circuitry 16 may process these signals to produce accurate color ambient light sensor data. For example, the four different signals gathered from PD-R may be averaged to produce an average PD-R signal, the four different signals gathered from PD-D may be averaged to produce an average PD-D signal, and the average PD-D signal may be subtracted from the average PD-R signal to produce a final red channel data value. Data values for the blue and green channels may then be produced in the same way. Color photodiode data may be processed to produce color temperature data or color coordinates and associated light intensity data. The color and intensity data may be compared to threshold values or otherwise processed to determine suitable actions to take in device 10 (e.g., adjusting display brightness and/or color in response to measured ambient light intensity and/or color information).

The illustrative arrangements of FIGS. 4 and 5 gather color photodiode signals from red, green, and blue colored photodiodes, but, in general, ambient light sensor 26 may have any suitable number of photodiodes of different spectral sensitivities (colors). For example, color ambient light sensor 26 may have four or more photodiodes of different colors, five or more photodiodes of different colors, six or more photodiodes of different colors, etc. In general, if there are N photodiodes in circuitry 52, there will be N×N switches in switch array 50 and N corresponding analog-to-digital converters 54.

Figure 6:
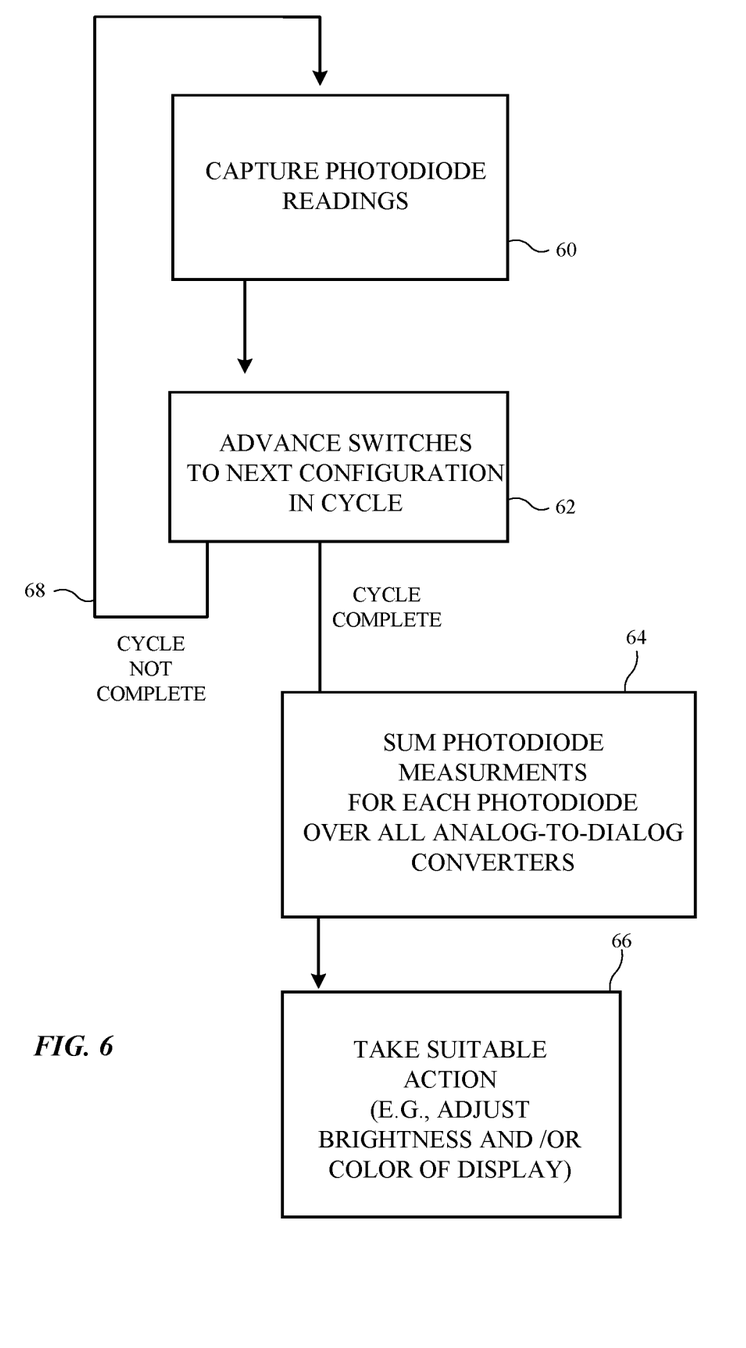
FIG. 6 is a flow chart of illustrative steps involved in operating an electronic device with a light sensor in accordance with an embodiment.

FIG. 6 is a flow chart of illustrative steps involved in gathering color ambient light sensor measurements by using switching circuitry such as switching circuitry 50 to distribute photodiode signals across multiple analog-to-digital converters 54.

At step 60, the array of switches in switching circuitry (switch array) 50 may be placed in a configuration that routes signals from each of the light detectors such as photodiodes PD in ambient light sensor 26 to a respective one of analog-to-digital converters 54. Analog-to-digital converters 54 may digitize these signals and the digitized values may be stored in storage in control circuitry (see, e.g., control circuitry 16). In configurations in which ambient light sensor 26 includes a dark current photodiode, the signals from the light detectors may include a dark current signal.

At step 62, control circuitry 16 may place the array of switches into another switch array configuration by reconfiguring the switches of switching circuitry 50 so that the signals from each of the photodiodes are routed to a different analog-to-digital converter. For example, the switches in switching circuitry 50 may be configured so that the signals from red photodiode PD-R are routed to ADC(i+1) rather than ADC(i), etc. Processing may then loop back to step 60 so that an additional set of signal measurements may be performed with the new switch configuration, as indicated by line 68. Incrementing the switch settings for the switching circuitry 50 ensures that each photodiode output will eventually be captured by each of converters 54 (and so the each converter 54 will digitize photodiode signals from each of the photodiodes).

When all photodiodes have supplied each converter 54 with an output signal (i.e., when each converter 54 has digitized a photodiode signal from each of the photodiodes in sensor 26), a color ambient light sensor measurement cycle has been completed and processing may proceed at step 64. During the operations of step 64, each of the individual measurements taken for each color may be averaged. For example, in a configuration of the type shown in FIG. 3, there will be three red measurements that can be averaged to produce an average red photodiode measurement, three green measurements that can be averaged to produce an average green photodiode measurement, and three blue measurements that can be averaged to produce an average blue photodiode measurement. In a configuration in which there is a dark current photodiode in ambient light sensor 26, there will be four measurements to average for each color and there will also be dark current measurements that can be averaged and subtracted from each of the averaged colored photodiode measurements. Dark current measurements may also be subtracted during step 60 (e.g., the dark current reading in each cycle can be subtracted from each of the colored photodiode readings in that cycle).

The color photodiode measurements (either raw measurements if no dark current measurements were available or corrected measurements if dark current measurements were subtracted) may be converted to ambient light intensity and color measurements (e.g., color temperature values or color coordinates) at step 66. Suitable actions may then be taken based on the measured ambient light intensity and/or measured ambient light color information. As an example, display brightness may be adjusted by control circuitry 16 (e.g., to increase brightness in response to detection of a high ambient light intensity or to decrease brightness in response to detection of a low ambient light intensity) and/or display color can be adjusted (e.g., the color cast of images on display 14 may be made warmer when ambient light color is warm and colder when ambient light color is cold, etc.).

Color ambient light sensor measurements may be gathered in response to a user command, in accordance with a schedule, in response to satisfying predetermined measurement criteria, continuously, etc. Actions may be taken in response to each new light sensor measurement, make be taken in response to detection that a light sensor measurement has exceeded predetermined threshold values, may be taken periodically (e.g., once per minute or other suitable time period), etc.

The foregoing is merely illustrative and various modifications can be made to the described embodiments. The foregoing embodiments may be implemented individually or in any combination.

What is claimed is:

1. An electronic device, comprising:
  a housing
  control circuitry in the housing;
  a color ambient light sensor in the housing having photodiodes of different colors;
  a plurality of analog-to-digital converters; and
  an array of switches that is operable to route photodiode signals from each of the photodiodes to each of the analog-to-digital converters, wherein the control circuitry is configured to place the array of switches in a plurality of different switch array configurations, wherein in each of the different switch array configurations the photodiode signal from each of the photodiodes is digitized by a different one of the analog-to-digital converters to produce digitized photodiode signals, and wherein the control circuitry is configured to average the digitized photodiode signals originating from each of the photodiodes of different colors obtained from the plurality of different switch array configurations to produce averaged photodiode signals for each of the different colors.

2. The electronic device defined in claim 1 wherein the color ambient light sensor includes a dark current photodiode.

3. The electronic device defined in claim 1 further comprising a display in the housing, wherein the control circuitry is configured to use the averaged photodiode signals for each of the different colors in adjusting the display.

4. The electronic device defined in claim 3 wherein the display has an active area with an array of pixels and an inactive border area that runs along an edge of the active area and wherein the inactive area has an ambient light sensor window through which the color ambient light sensor receives ambient light.

5. A method of making ambient light measurements using a set of photodiodes of different colors in a color ambient light sensor and using a corresponding set of analog-to-digital converters, comprising:
   with control circuitry, placing a switch array in a plurality of different switch array configurations;
   for each photodiode in the set of photodiodes, routing photodiode signals from that photodiode through the switch array to a different respective one of the analog-to-digital converters in each of the plurality of different switch array configurations to produce digitized photodiode signals; and
   averaging the digitized photodiode signals originating from each of the photodiodes of different colors obtained from the plurality of different switch array configurations to produce averaged photodiode signals for each of the different colors.

6. The method defined in claim 5 wherein routing the photodiode signals comprises routing a photodiode output from each of the photodiodes to each of the analog-to-digital converters in the set of analog-to-digital converters.

7. The method defined in claim 6 wherein the switch array has N×N switches, wherein the set of photodiodes has N photodiodes, and wherein the set of analog-to-digital converters has N analog-to-digital converters.

8. The method defined in claim 7 further comprising:
   in each of the plurality of different switch array configurations, digitizing the photodiode outputs with the set of analog-to-digital converters.

9. The method defined in claim 8 further comprising:
   with the control circuitry, averaging the digitized photodiode output of each photodiode to produce N averaged digitized photodiode measurements each of which is associated with a respective one of the N photodiodes.

10. The method defined in claim 9 wherein placing the switch array in the plurality of different switch array configurations comprises cycling the switch array through N different switch array configurations to produce the N averaged digitized photodiodes measurements.

11. Color ambient light sensor circuitry, comprising:
   a first photodiode with a first spectral response;
   a second photodiode with a second spectral response that is different than the first spectral response, and
   a third photodiode with a third spectral response that is different than the first and second spectral responses;
   a first analog-to-digital converter;
   a second analog-to-digital converter;
   a third analog-to-digital converter;
   a switch array that is coupled between the first, second, and third photodiodes and the first, second, and third analog-to-digital converters and that is configured to distribute signals from each of the first, second, and third photodiodes to each of the first, second, and third analog-to-digital converters; and
   control circuitry that is configured to place the switch array in a plurality of different switch array configurations, wherein in each of the different switch array configurations the photodiode signals from each of the first, second, and third photodiodes is digitized by a different one of the analog-to-digital converters, and
   wherein the control circuitry is configured to average the digitized photodiode signals from the first, second, and third analog-to-digital converters obtained from the plurality of different switch array configurations to produce a first averaged photodiode signal associated with the first photodiode, a second averaged photodiode signal associated with the second photodiode, and a third averaged photodiode signal associated with the third photodiode.

12. The color ambient light sensor circuitry defined in claim 11 wherein the switch array has at least nine switches and is operable in at least first, second, and third switch array configurations, wherein:
   in the first switch array configuration, the switch array is configured to route signals from the first photodiode to the first analog-to-digital converter;
   in the second switch array configuration, the switch array is configured to route signals from the first photodiode to the second analog-to-digital converter; and
   in the third switch array configuration, the switch array is configured to route signals from the first photodiode to the third analog-to-digital converter.

13. The color ambient light sensor circuitry defined in claim 12 wherein:
   in the first switch array configuration, the switch array is configured to route signals from the second photodiode to the second analog-to-digital converter;
   in the second switch array configuration, the switch array is configured to route signals from the second photodiode to the third analog-to-digital converter; and
   in the third switch array configuration, the switch array is configured to route signals from the second photodiode to the first analog-to-digital converter.

14. The color ambient light sensor circuitry defined in claim 13 wherein:
   in the first switch array configuration, the switch array is configured to route signals from the third photodiode to the third analog-to-digital converter;
   in the second switch array configuration, the switch array is configured to route signals from the third photodiode to the first analog-to-digital converter; and
   in the third switch array configuration, the switch array is configured to route signals from the third photodiode to the second analog-to-digital converter.

15. The color ambient light sensor circuitry defined in claim 11 further comprising:
   a dark current photodiode that is insensitive to light; and
   a fourth analog-to-digital converter, wherein the switch array is coupled between the dark current photodiode and the fourth analog-to-digital converter.

16. The color ambient light sensor circuitry defined in claim 15 wherein the switch array is operable in at least four switch array configurations and wherein in each of the four switch array configurations dark current from the dark current photodiode is routed respectively to a different respective one of the first, second, third, and forth analog-to-digital converters.

17. The color ambient light sensor circuitry defined in claim 11 further comprising a dark current photodiode coupled to the switch array, wherein the control circuitry is configured to subtract dark current data obtained from the dark current photodiode from the first averaged photodiode signal, from the second averaged photodiode signal, and from the third averaged photodiode signal.

18. The color ambient light sensor circuitry defined in claim 17 wherein the control circuitry is configured to generate ambient light color and intensity information from the first, second, and third averaged photodiode signals from which the dark current has been subtracted.

* * * * *

UNITED STATES PATENT AND TRADEMARK OFFICE
CERTIFICATE OF CORRECTION

PATENT NO. : 10,254,160 B2  
APPLICATION NO. : 15/465409  
DATED : April 9, 2019  
INVENTOR(S) : Dong Zheng Page 1 of 1

It is certified that error appears in the above-identified patent and that said Letters Patent is hereby corrected as shown below:

In the Claims

Column 11, Line 6, "respective one of the first, second, third, and forth" should read -- respective one of the first, second, third, and fourth --

Signed and Sealed this  
Eighteenth Day of February, 2020

Andrei Iancu  
*Director of the United States Patent and Trademark Office*